United States Patent [19]
Minakuchi

[11] Patent Number: 5,189,654
[45] Date of Patent: Feb. 23, 1993

[54] AUTOMATIC GAIN CONTROL APPARATUS FOR USE IN OPTICAL DISC RECORDING AND PLAYBACK SYSTEM

[75] Inventor: Tadashi Minakuchi, Tokyo, Japan

[73] Assignee: Asahi Kogaku Kogyo Kabushiki Kaisha, Tokyo, Japan

[21] Appl. No.: 801,619

[22] Filed: Dec. 3, 1991

Related U.S. Application Data

[63] Continuation of Ser. No. 450,559, Dec. 14, 1989, abandoned.

[30] Foreign Application Priority Data

Dec. 14, 1988 [JP] Japan .............................. 63-162209[U]

[51] Int. Cl.⁵ .............................................. G11B 7/00
[52] U.S. Cl. .................................................. 369/44.36
[58] Field of Search .................. 369/116, 44.11, 44.25, 369/44.29, 44.35, 44.36, 44.41, 44.26; 360/77.01, 77.02, 77.03, 77.04, 77.06

[56] References Cited

U.S. PATENT DOCUMENTS

| | | | |
|---|---|---|---|
| Re. 31,160 | 2/1983 | Kinjo | 369/44.36 |
| 4,338,682 | 7/1982 | Hosaka et al. | 360/77.06 X |
| 4,482,987 | 11/1984 | Okada | 369/47 X |
| 4,747,089 | 5/1988 | Eguchi et al. | 369/44.34 |
| 4,807,207 | 2/1989 | Konno | 369/44.29 X |

Primary Examiner—Robert L. Richardson
Attorney, Agent, or Firm—Sandler, Greenblum & Bernstein

[57] ABSTRACT

A power of a light beam incident on an optical disk is increased when data is recorded on the optical disk in comparison with the time when the optical disk is played back. A level of a playback signal from the optical disk is held when an operation mode is switched from a playback mode to a recording mode to maintain a stable tracking servo. Furthermore, a signal produced from a photo sensor receiving a reflected beam from the optical disk is reduced when the optical disk is recorded so that a comparatively narrow dynamic range is required in a tracking servo loop.

32 Claims, 17 Drawing Sheets

TRACK DIRECTION

TRACK DIRECTION

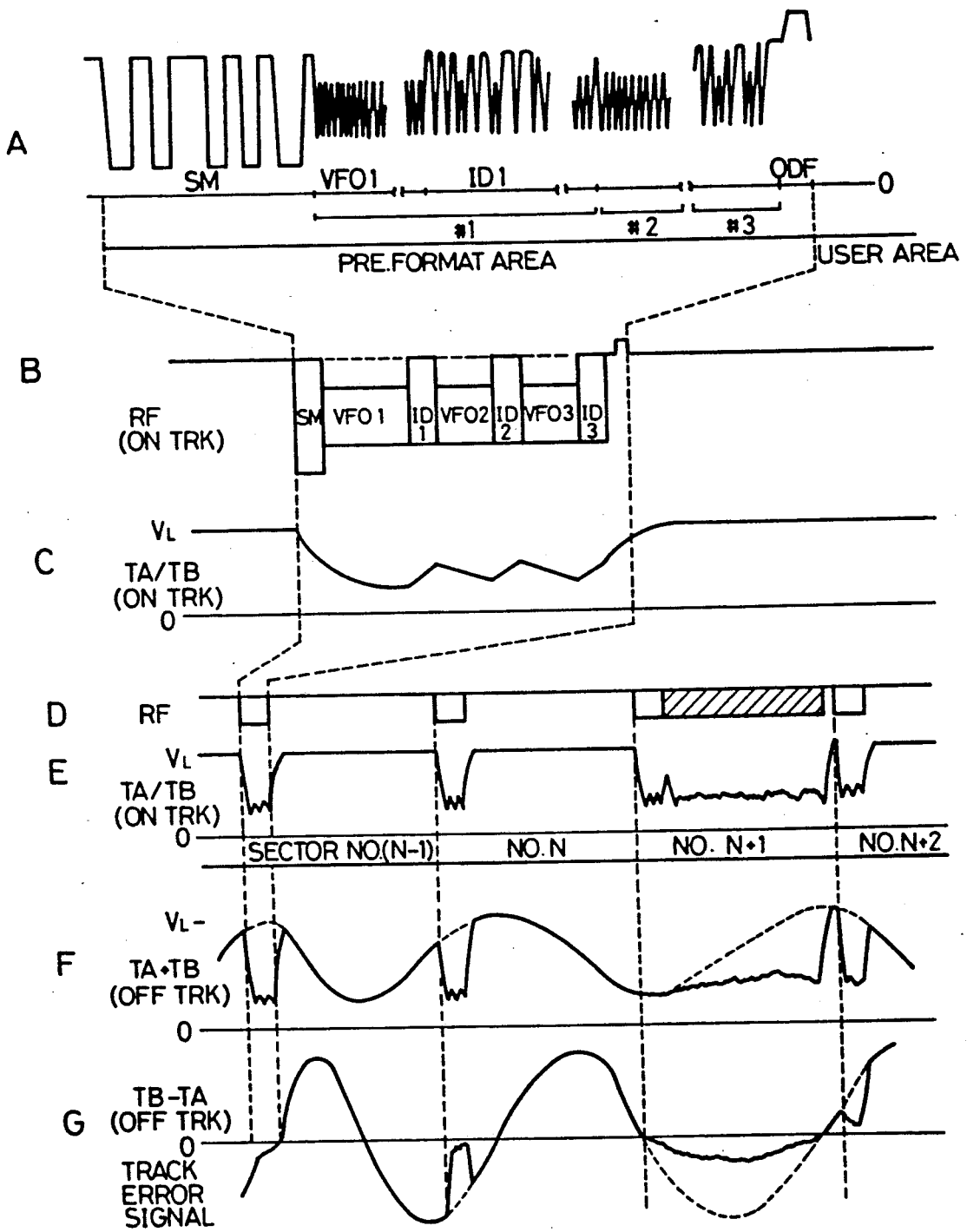

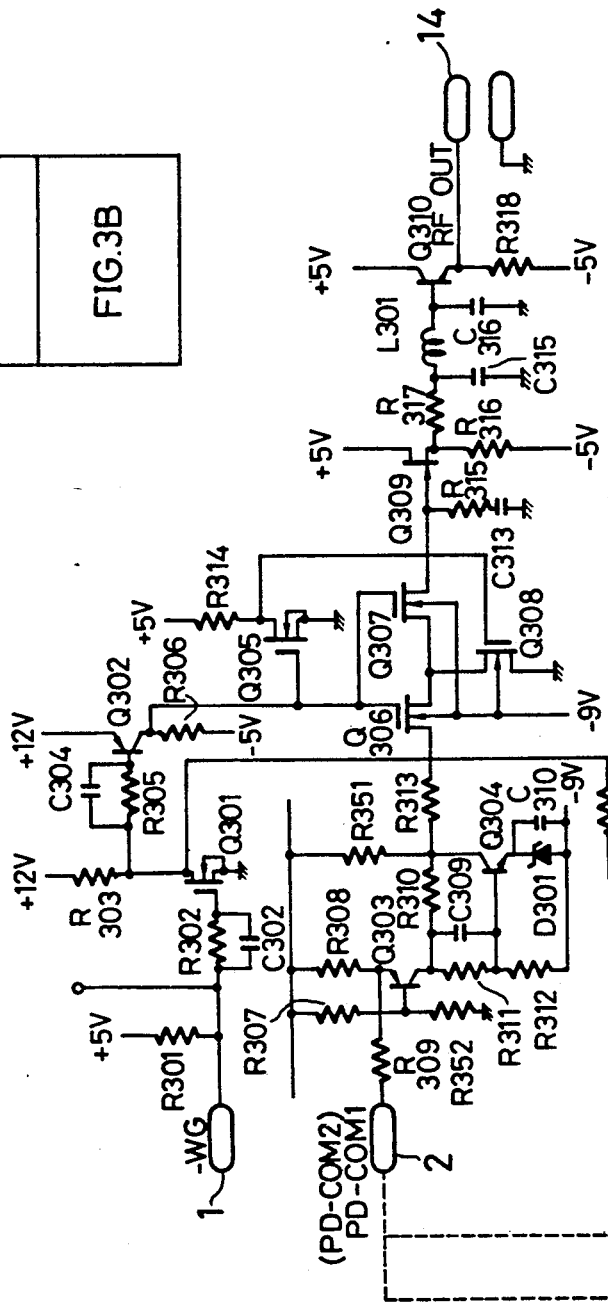

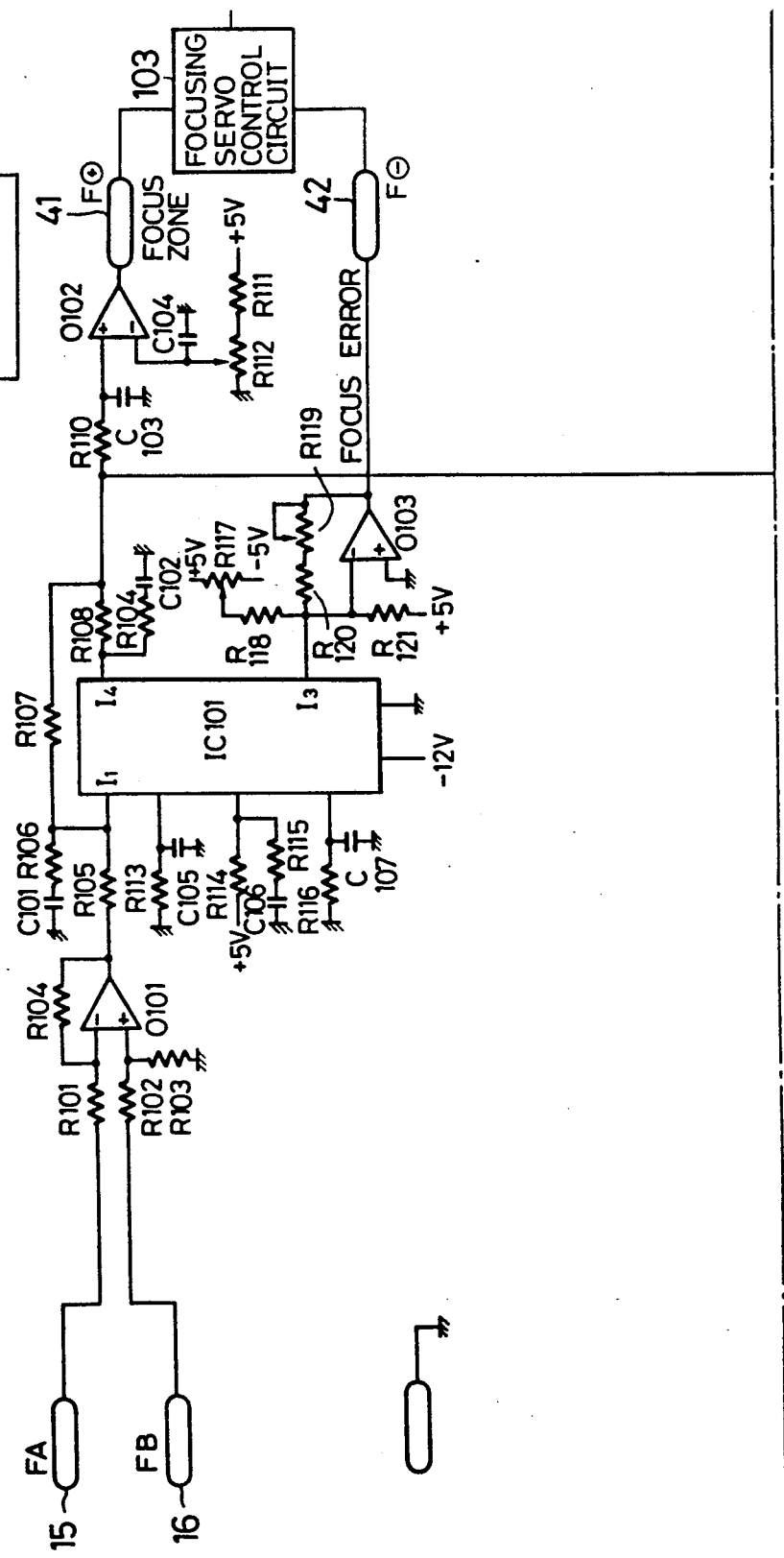

INSIDE

OUTSIDE

FIG. 10
OFF TRACK
A
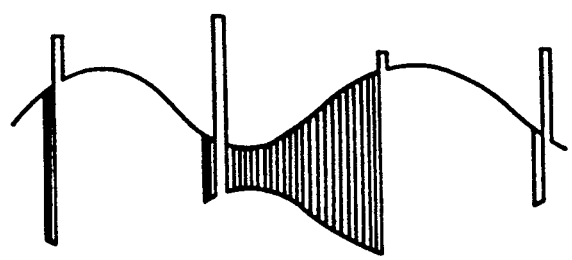
B
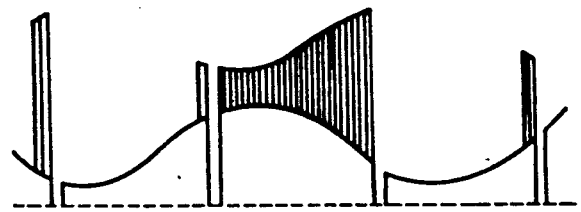
C
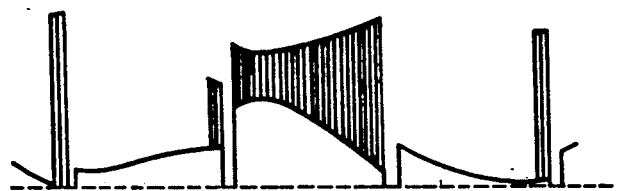

AUTOMATIC GAIN CONTROL APPARATUS FOR USE IN OPTICAL DISC RECORDING AND PLAYBACK SYSTEM

This application is a continuation of application Ser. No. 07/450,559, filed Dec. 14, 1989, now abandoned.

BACKGROUND OF THE INVENTION

This invention relates to an automatic gain control apparatus, including a servo control unit responsive to a servo error signal for locating a movable head with respect to a recording medium.

Optical disks have been employed as a recording medium has been employed to store data on tracks thereof. An optical head is used to play back the data recorded on the optical disk. A typical optical head includes a light source, such as a semiconductor laser, for radiating a light (laser) beam through an objective lens onto the optical disk. The objective lens is positioned at a predetermined distance from the optical disk for focusing the light beam on the data recording layer on the optical disk. The optical head also includes 40 photo sensors for sensing the light beam reflected from the optical disk to determine the presence and absence of pits formed in the spiral tracks of the optical disk. The objective lens is supported in such a manner that its optical axis can follow the spiral track and can move from one track to a desired track during a seeking operation, as well as to the direction of the optical axis for focusing.

In order to locate the optical head at an optimum position against the optical disk, the optical head is associated with a focusing servo unit for moving the objective lens in a focusing direction parallel to the optical axis thereof so as to maintain the predetermined distance from the optical disk when the distance of the objective lens from the optical disk deviates from the predetermined distance. The optical head is also associated with a tracking servo unit for moving the objective lens in a tracking direction perpendicular to the track to locate the light spot on the optical disk at the center of the track when the optical axis deviates from the track center.

A part of the light beam reflected on the optical disk is incident on a photo sensor divided into four independent elements A1, B1, C1 and D1, as shown in FIG. 1A. Another part of the reflected light beam is split into two light beams incident on respective two photo sensor elements E2 and F2, located at positions corresponding to the opposite sides of the track at the same distance from the track center, as shown in FIG. 1B. Each photo sensor element converts the light incident thereon into an electric signal having a level corresponding to the intensity of the incident light beam. The electric signals derived from the photo sensor elements A1 and C1 are added to form an FA signal. The electric signals derived from the photo sensor elements B1 and D1 are added to form an FB signal. The photo sensor element E2 converts the light incident thereon into a TA signal having a level corresponding to the intensity of the incident light, and the photo sensor element F2 converts the light incident thereon into a TB signal having a level corresponding to the incident light. The playback signals derived from the photo sensor elements A1 to D1, E2 and F2 are added to form an RF signal. The RF signal is to read data recorded on the optical disk but the TA and TB signals are to generate a tracking error signal and the latter is not required to include data component recorded on the optical disk. Therefore the TA and TB signals is limited to a narrow band of frequencies (e.g., below 50 KHz).

Each track comprises a plurality of sectors, each having a pre-format area preceding to a user area on which pits are formed to store data from, for example, a music or image source. The pre-format area has pre-format data previously recorded thereon for use in recording and playing back data on the user area.

FIG. 2A shows a waveform of a pre-format signal included in the RF signal resulting from playback of the pre-format data recorded on the pre-format area under a tracking servo control. The pre-format signal includes a sector mark (SM), a mirror mark (ODF) and VFO and ID signals repeated three times alternatively between the sector mark (SM) and the mirror mark (ODF). The sector mark indicates the start of the pre-format signal. Each VFO signal contains clock pules required to reproduce the succeeding ID signal and has a frequency higher than any other signals recorded on the optical disk. Each ID signal includes at least a sector address and an error detection code. The mirror mark (ODF) is used to adjust the electrical offset of the tracking servo circuit. The mirror mark (ODF) has a level higher than any other signals recorded on the optical disk and a signal from a non-recorded area on the track which is formed as a pre-groove because the ODF is formed by not forming the pre-groove, namely by leaving a mirror surface of the optical disk.

FIG. 2B shows the RF signal on a reduced time scale. As shown in FIG. 2C, the TA (or TB) signal, which is produced from the photo sensor element E2 (orF2), has a level that is lower when the optical head passes the pre-format area because the pre-format data is recorded on the pre-format area. However, the data recorded on the optical disk can not be played back from the TA (or TB) signal.

FIG. 2D shows the RF signal on a further reduced time scale. It is assumed that the user area of the data sector No. N+1 has recorded data thereon, as indicated by the hatched area in FIG. 2D. As shown in FIG. 2E, the level of the TA (or TB) signal is also lower at the user area of the data sector No. N+1, as well as the pre-format area. It is, therefore, apparent that the level of the tracking error signal produced from the difference (TB−TA) between the TB and TA signals is reduced to a smaller level in the pre-format and user areas having data recorded thereon than in the user areas having no data recorded thereon. Consequently, the tracking servo control is particularly sensitive to disturbances when the optical head passes the recorded areas.

In order to avoid the difficulty, an automatic gain control (AGC) circuit is required to compensate for the level drop of the tracking error signal in the recorded areas. In the previous apparatus, the gain control is performed on an assumption that the level drop of the tracking error signal can be represented merely by the corresponding level drop in the RF signal. Therefore, it was very difficult to provide an accurate compensation for the level drop of the tracking error signal because track cross components are superimposed in the (TA+TB) signal and the tracking error signal (TA−TB), as shown in FIGS. 2F and 2G, respectively, when the optical head traverses the tracks with the tracking servo control being suspended.

Such a gain control will render it difficult to ensure a rapid lock-in operation when the tracking servo control is resumed. In addition, the counter, which is used to count the number of peaks of the RF signals so as to count the number of traversed tracks, would accumulate an incorrect count.

Furthermore, since a power of the laser beam incident on the optical disk is increased in a recording mode in comparison with a playback mode, the output level of the photo sensor is also increased. In a conventional apparatus, such a level increase at the time of recording is also controlled by the automatic gain control circuit. Therefore, a very wide dynamic range is required in the automatic gain control circuit to control both of the lower level at the time of playback and the higher level at the time of recording. In addition, when the mode is switched from the recording mode to the playback mode, the tracking servo tends to become unstable, so that the lock of the tracking servo is apt to be removed by the disturbances.

SUMMARY OF THE INVENTION

Therefore, it is an object of the present invention to provide an improved automatic gain control apparatus which can perform an accurate and stable servo control that is free from disturbances caused by a mode change.

There is provided, in accordance with this invention, an automatic gain control apparatus comprising means for receiving at least one light beam which is incident on an optical disk and is reflected by said optical disk and for producing a signal in accordance with a state of said optical disk;

means for amplifying a playback signal which is produced from said light beam receiving and that includes data recorded on said optical disk;

means for holding said playback signal amplifyed by said playback signal amplifying when data is recorded on said optical disk;

means responsive to a control signal for controlling a gain of a tracking error signal; and means for generating said control signal from said signal outputted from said holding means.

According to this invention, during a recording mode, the playback signal is attenuated to a predetermined level that is substantially equal to that of the playback signal obtained during a playback mode. This is effective to maintain the tracking servo within a narrow dynamic range. In addition, when the operating mode is shifted from the playback mode to the recording mode, the level of the playback signal for producing a control signal to control the gain of the tracking error signal is held at a level obtained just before the mode is shifted to the recording mode. This is effective to provide a stable tracking error signal regardless of the operation mode.

BRIEF DESCRIPTION OF THE DRAWINGS

FIGS. 2A to 2G are waveforms of playback signals produced from the optical head;

FIGS. 3A and 3B are circuit diagrams of a playback signal level control circuit used in an automatic gain control apparatus of this invention;

FIGS. 4A and 4B are circuit diagram of a servo error signal generator used in the automatic gain control apparatus of this invention;

FIGS. 10A to 10C are waveforms obtained in the TCR signal generator when the tracking servo control is off;

DETAILED DESCRIPTION OF THE PREFERRED EMBODIMENT

Figure 1A:
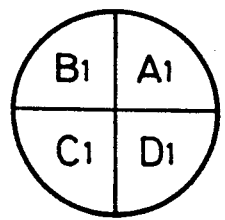
FIGS. 1A and 1B are schematic diagrams showing photo sensor elements used in an optical head.
Figure 1B:
Figure 3B:
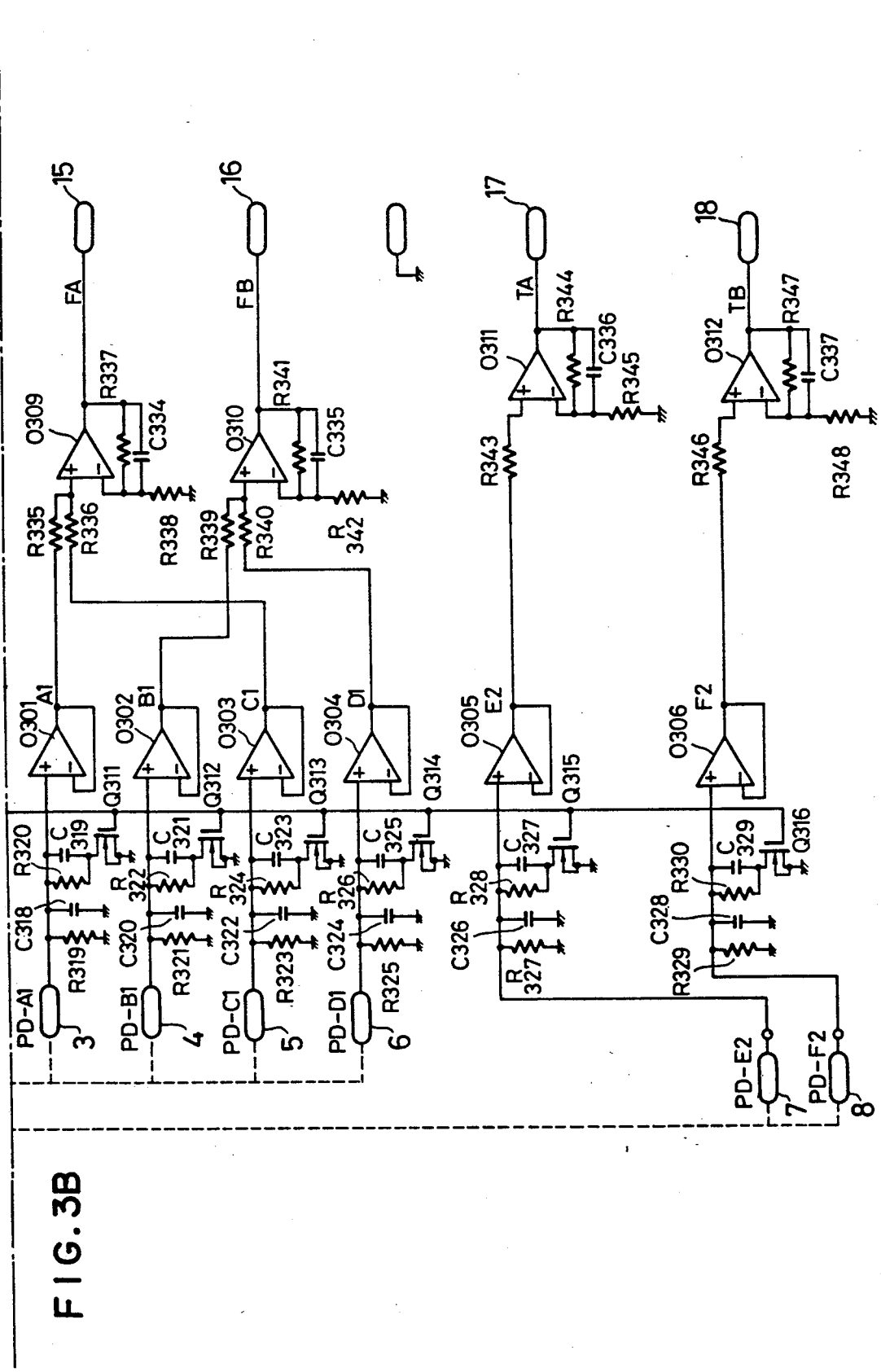

Referring to FIG. 3, there are shown eight input terminals labelled 1 through 8. Input terminals 3, 4, 5 and 6 are coupled to photo sensor elements A1, B1, C1 and D1, respectively. Input terminal 3 is coupled to a low pass filter comprising resistor R319 and capacitor C318 for removing noise from the signal inputted to input terminal 3. The output of the low pass filter is coupled to an amplifier comprising operational amplifier 0301, which in turn is coupled through resistor R335 to the positive input of operational amplifier 0309. The output of the low pass filter is also coupled to resistor R320, which is connected in parallel with capacitor C319 and in series with FET Q311. When the FET Q311 is turned on, the parallel circuit of resistor R230 and capacitor C319 is connected in parallel with the low pass filter for attenuating the signal produced at the output of the low pass filter to a predetermined extent.

Input terminal 5 is coupled to a low pass filter comprising resistor R323 and capacitor C322 for removing noises from the signal inputted to input terminal 5. The output of this low pass filter is coupled to an amplifier comprising operational amplifier 0303 which in turn is coupled through resistor R336 to the positive input of operational amplifier 0309. Operational amplifier 0309 serves as an adder for adding the signals applied from photo sensor elements A1 and C1 to produce an FA signal. The FA signal is applied to output terminal 15. The output of the low pass filter is also coupled to resistor R324 which is connected in parallel with capacitor C323 and in series with FET Q313. When FET Q313 is turned on, the parallel circuit of resistor R324 and capacitor C323 is connected in parallel with the low pass filter for attenuating the signal produced at the output of the low pass filter to a predetermined extent.

Input terminal 4 is coupled to a low pass filter comprising resistor R321 and capacitor C320 for removing noises from the signal inputted to input terminal 4. The output of the low pass filter is coupled to an amplifier comprising operational amplifier 0302, which in turn is coupled through resistor R339 to the positive input of operational amplifier 0310. The output of the low pass filter is also coupled to resistor R322, which is connected in parallel with capacitor C321 and in series with FET Q312. When FET Q312 is turned on, the parallel circuit of resistor R322 and capacitor C321 is connected in parallel with the low pass filter for attenuating the signal produced at the output of the low pass filter to a predetermined extent.

Input terminal 6 is coupled to a low pass filter comprising resistor R325 and a capacitor C324 for removing noises from the signal inputted to input terminal 6. The output of this low pass filter is coupled to an amplifier comprising operational amplifier 0304, which in turn is coupled through resistor R340 to the positive input of operational amplifier 0310. Operational amplifier 0310 serves as an adder for adding the signals applied from the photo sensor elements B1 and D1 to produce an FB signal. The FB signal is applied to output terminal 16. The output of the low pass filter is also connected to resistor R326, which is connected in parallel with capacitor C325 and in series with an FET Q314. When FET Q314 is turned on, the parallel circuit of resistor R326 and capacitor C325 is connected in parallel with the low pass filter for attenuating the signal produced at the output of the low pass filter to a predetermined extent.

Input terminals 7 and 8 are coupled to the photo sensor elements E2 and F2, respectively. Input terminal 7 is coupled to a low pass filter comprising resistor R327 and capacitor C326 for removing noises from the signal inputted to input terminal 7. The output of the low pass filter is coupled to an amplifier comprising operational amplifier 0305, which in turn is coupled through resistor R343 to an amplifier comprising operational amplifier 0311 for producing a TA signal. The TA signal is applied to output terminal 17. The output of the low pass filter is also coupled to resistor R328, which is connected in parallel with capacitor C327 and in series with FET Q315. When FET Q315 is turned on, the parallel circuit of resistor R328 and capacitor C327 is connected in parallel with the low pass filter for attenuating the signal produced at the output of the low pass filter to a predetermined extent.

Input terminal 8 is coupled to a low pass filter comprising resistor R329 and capacitor C328 for removing noises from the signal inputted to input terminal 8. The output of this low pass filter is coupled to an amplifier comprising operational amplifier O306, which in turn is coupled through resistor R346 to an amplifier comprising operational amplifier O312 for producing a TB signal. The TB signal is applied to output terminal 18. The output of the low pass filter is also coupled to resistor R330 which is connected in parallel with capacitor C329 and in series with FET Q316. When FET Q316 is turned ON, the parallel circuit of resistor R330 and capacitor C329 is connected in parallel with the low pass filter for attenuating the signal produced at the output of the low pass filter to a predetermined extent.

The signals from the photo sensor elements A1 to D1, E2 and F2 are added and applied to input terminal 2. Input terminal 2 is coupled to a sample and hold circuit through a broad band amplifier comprising transistors Q303 and Q304. The sample and hold circuit comprises FETs Q305 to Q308, a resistor R315 and a capacitor C313. The output of the sample and hold circuit is coupled through an amplifier comprising FET Q309 to a low pass filter comprising a resistor R317, capacitors C315 and C316 and inductor L301 for removing noises from the amplified signal. The output of the low pass filter is coupled through a buffer comprising transistor Q310 to output terminal 14.

Figure 6:
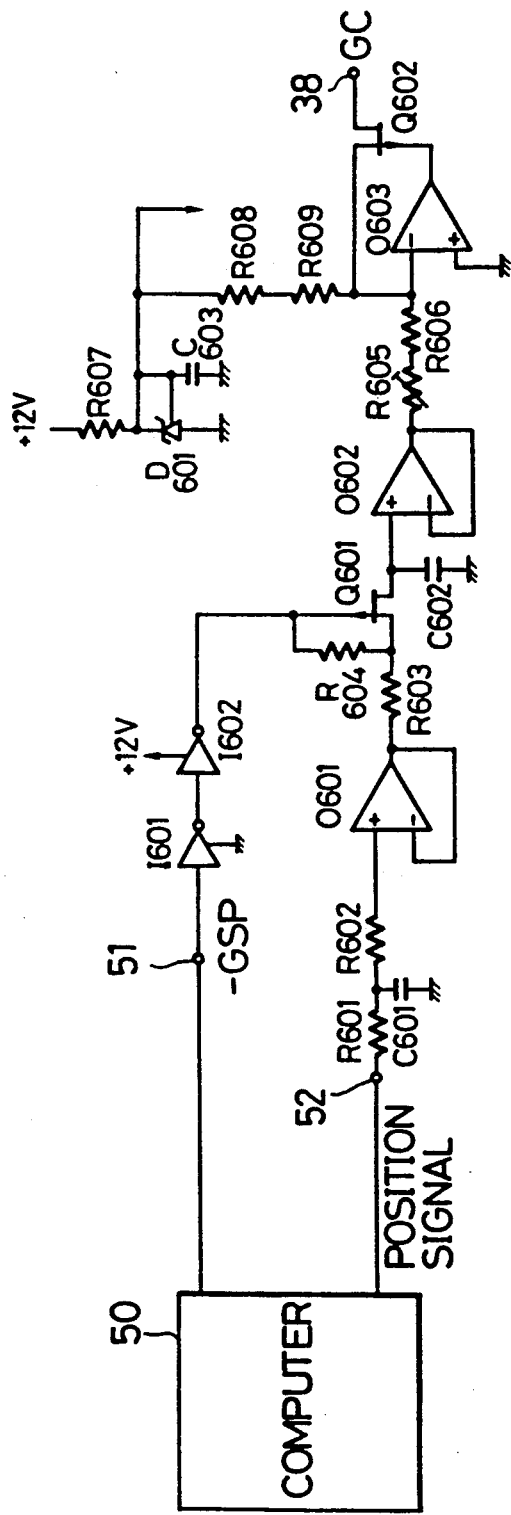
FIG. 6 is a circuit diagram of a gain control signal generator used in this invention.

A −WG signal is applied from a microcomputer 50, shown in FIG. 6, to input terminal 1. The −WG signal has a low level during a recording operation mode and a high level during a playback operation mode. Input terminal 1 is coupled through resistor R302 paralleled by capacitor C302 to a gate of FET Q301. FET Q301 has a drain connected through resistor R303 to a specific voltage and a grounded source. The drain of FET Q301 is connected through resistor R305 paralleled by capacitor C304 to a base of transistor Q302. Transistor Q302 has an emitter connected to a specific voltage and a collector connected through resistor R306 to another specific voltage. The collector of transistor Q302 is connected to the gates of FETs Q305, Q306 and Q307.

During a playback mode, FET Q301 receives a high level input and thus is maintained in its ON state. As a result, the FETs Q311 to Q316 are maintained in an OFF state, inhibiting a signal attenuation function for the respective circuits. In addition, transistor Q302 is maintained in its ON state, turning ON FETs Q305, Q306 and Q307 and turning OFF FET Q308. Consequently, the amplified signal produced at the collector of transistor Q304 is passed through FETs Q306 and Q307 to charge capacitor C313 through resistor R315. The charge on capacitor C313, which is the output of the sample and hold circuit, is applied to the amplifier comprising FET Q309. Under this condition, the sample and hold circuit produces an output signal corresponding to the magnitude of an RF signal applied from the amplifier comprising transistors Q303 and Q304.

When the operation is changed from the playback mode into a recording mode, FET Q301 changes to an OFF state in response to a LOW input. As a result, FETs Q311 to Q316 change to the ON state to attenuate the signals applied to respective operational amplifiers O301 to O306 to predetermined levels in compliance with that of the playback signals. In addition, transistor Q302 is turned OFF to turn OFF FETs Q305, Q306 and Q307 and at the same time turn ON FET Q308. As a result, the amplified signal produced at the collector of transistor Q304 is blocked. Under this condition, the charge on capacitor C313 is held. The held capacitor charge corresponds to the magnitude of the amplified signal produced at the collector of transistor Q304 just before the operation is changed to the recording mode. The holding period of capacitor C313 is determined at a value corresponding to a period (e.g., 2 msec.) during which the optical head passes one sector since the recording is made for each sector. The voltage held in capacitor C313 is applied through resistor R315 to the gate of FET Q309. The output signal from FET Q309 is applied to the base of transistor Q310 through the low-pass filter comprising resistor R317, capacitors C315 and C316 and inductor L301 and the signal outputted from transistor Q310 is applied to terminal 14 and further to terminal 31, shown in FIG. 8.

Figure 4B:
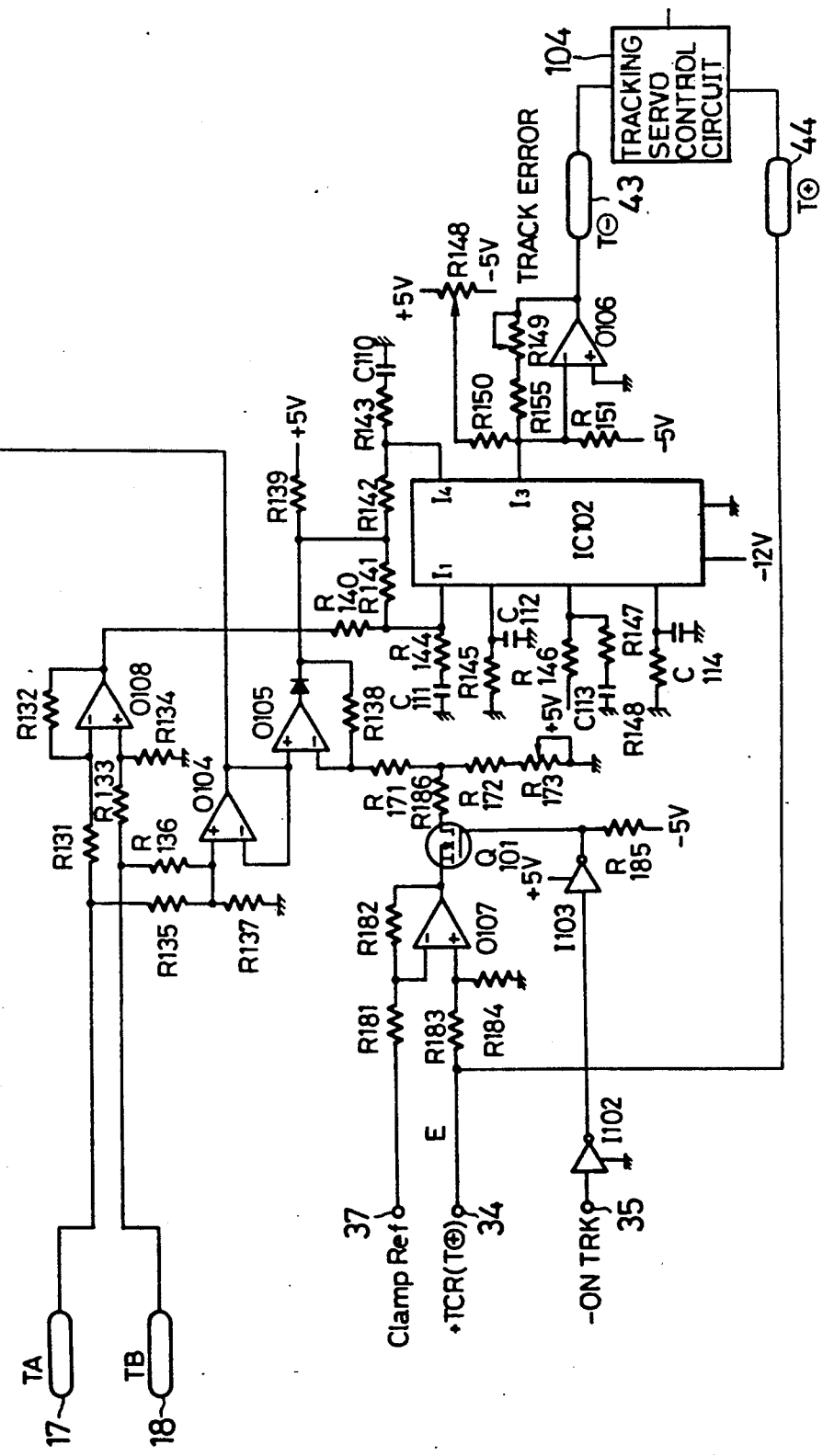

Referring to FIG. 4, there is illustrated a servo error signal generator used in the automatic gain control apparatus of this invention. The servo error signal generator includes an input terminal 15 to which the FA signal is applied, from terminal 15 shown in FIG. 3, and another input terminal 16 to which the FB signal is applied from the terminal 16 shown in FIG. 3. Input terminal 15 is coupled through resistor R101 to a negative input of an operational amplifier O101, while a positive input is coupled through resistor R102 to input terminal 16. Operational amplifier O101 forms a differential amplifier along with resistors R103 and R104.

The differential amplifier produces an error signal (FB−FA) at the output of the operational amplifier O101 that is indicative of a difference between the FA and FB signals. The output of the operational amplifier O101 is coupled to a first input I1 and a second input I4 of a first integrated circuit IC101. The integrated circuit IC101 controls the gain of the focusing servo by dividing the value of the signal applied to the first input I1 by the value of the signal applied to the second input I4 and outputting a signal indicative of the result of the division at output I3. Output I3 of the integrated circuit IC101 is coupled to the negative input of an operational amplifier O103 that has a grounded positive input. Operational amplifier O103 forms an amplifier in conjunction with resistors R119, R120 and R121. A focusing error signal produced at the output of the operational amplifier O103 is supplied to an output terminal 42 for connection to a focusing servo control circuit 103.

The servo error signal generator also includes an input terminal 17 to which the TA signal is applied from the terminal 17 shown in FIG. 3 and another input terminal 18 to which the TB signal is applied from the terminal 18 shown in FIG. 3. The input terminal 17 is coupled through resistor R131 to a negative input of an operational amplifier O108, while a positive input of the operational amplifier O108 is coupled through resistor R133 to the input terminal 18. The operational amplifier O108 forms a differential amplifier along with resistors R132 and R134. The differential amplifier produces an error signal (TB−TA) that is indicative of a difference between the TA and TB signals from the output of operational amplifier O108. The output of operational amplifier O108 is coupled through resistor R140 to a first input I1 and a second input I4 of a second integrated circuit IC102. The second integrated circuit IC102 controls the gain of the tracking servo by dividing the value of the signal applied to the first input I4 by the value of the signal applied to the second input I4 and producing an output signal at output I3. Output I3 of the second integrated circuit IC102 is coupled to a negative input of operational amplifier O106 that has a grounded positive input. The operational amplifier O106 forms an amplifier along with resistors R149, R155 and R151. A tracking error signal produced at the output of the operational amplifier O106 is coupled to an output terminal 43 for connection to a tracking servo control circuit 104.

Figure 5A:
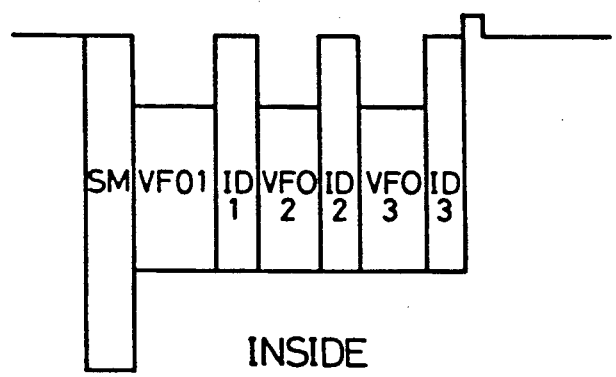
FIGS. 5A and 5B are diagrams used in explaining playback signal level drops.
Figure 5B:
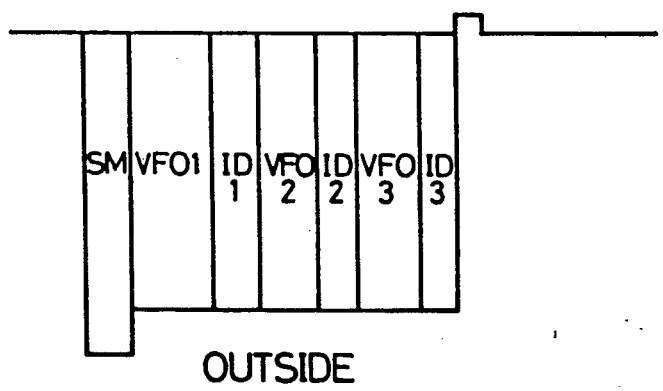

Since the optical disk is usually a constant angular velocity (CAV) type disk, the length of pits formed in recording a signal on an optical disk decreases as the pits are formed closer to the center of the optical disk and also as the signal has a higher frequency. FIG. 5A shows the waveforms of the RF signal played back from an inner track, whereas FIG. 5B shows the waveforms of the RF signal played back from an outer track. As can be seen from a comparison of FIGS. 5A and 5B, the levels of a VFO signal played back from the inner track are lower than that of the VFO signals played back from the outer track because each VFO signal has a high frequency.

Referring to FIG. 6, there is illustrated a gain control (GC) signal generator used in the apparatus of the present invention for compensating for a VFO signal level drop. The gain control signal generator includes a first input terminal 51 to which a −GSP signal is applied from a computer 50 and a second input terminal 52 to which a track position signal is applied from the computer 50. The level of the −GSP signal is inverted to a logic level L, for example, time the optical head crosses a predetermined number of tracks. Input terminal 51 is coupled through two inverters I601 and I602 to a gate of an FET Q601.

Figure 7A:
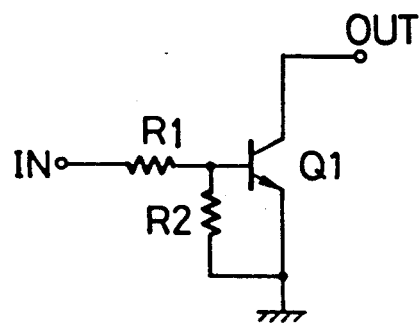
FIGS. 7A and 7B are circuit diagrams of inverters used in this invention.
Figure 7B:
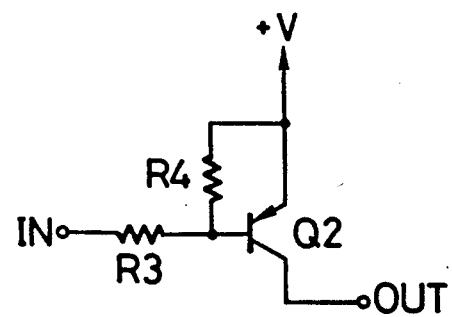

As shown in FIG. 7A, inverter I601 comprises a NPN transistor Q1, a base of which is connected with an input terminal through resistor R1 and with a grounded emitter thereof through resistor R2 and a collector of which is connected to an output terminal. Therefore, inverter I601 outputs a logic level L when a logic level H is inputted and the output thereof is open when a logic level L is inputted. Also as shown in FIG. 7B, inverter I602 comprises a PNP transistor Q2, a base of which is connected with an input terminal through resistor R3, an emitter of which is connected to a specific voltage and with the base thereof through resistor R4 and a collector of which is connected to an output terminal. Therefore, the inverter I602 outputs a logic level H when a logic level L is inputted and the output thereof is open when a logic level H is inputted.

The track position signal is indicative of the distance at which the optical head is located in a radial direction of the optical disk. The input terminal 52 is coupled to resistor R601 and capacitor C601, which forms an integrator. The output of the integrator is coupled through resistor R602 to a positive input of an operational amplifier O601 that functions as a buffer amplifier. The output of the operational amplifier O601 is coupled through a resistor R603 to a drain of FET Q601, while a source of the FET O601 is grounded through capacitor C602. The FET Q601 is turned ON to charge capacitor C602 with the output of the operational amplifier O601 when the −GSP signal has a LOW level. The FET Q601 is turned OFF to disconnect the capacitor C602 from the output of the operational amplifier O601 when the −GSP signal has a HIGH level. The source of FET Q601 is coupled to an output terminal 38 through an amplifier which comprises operational amplifiers O602 and O603 and an FET Q602 to produce a gain control (GC) signal at the output terminal 38. Thus, the gain control (GC) signal has a signal level that is in compliance with a position on the optical head in the radial direction of the optical disk.

Figure 8A:
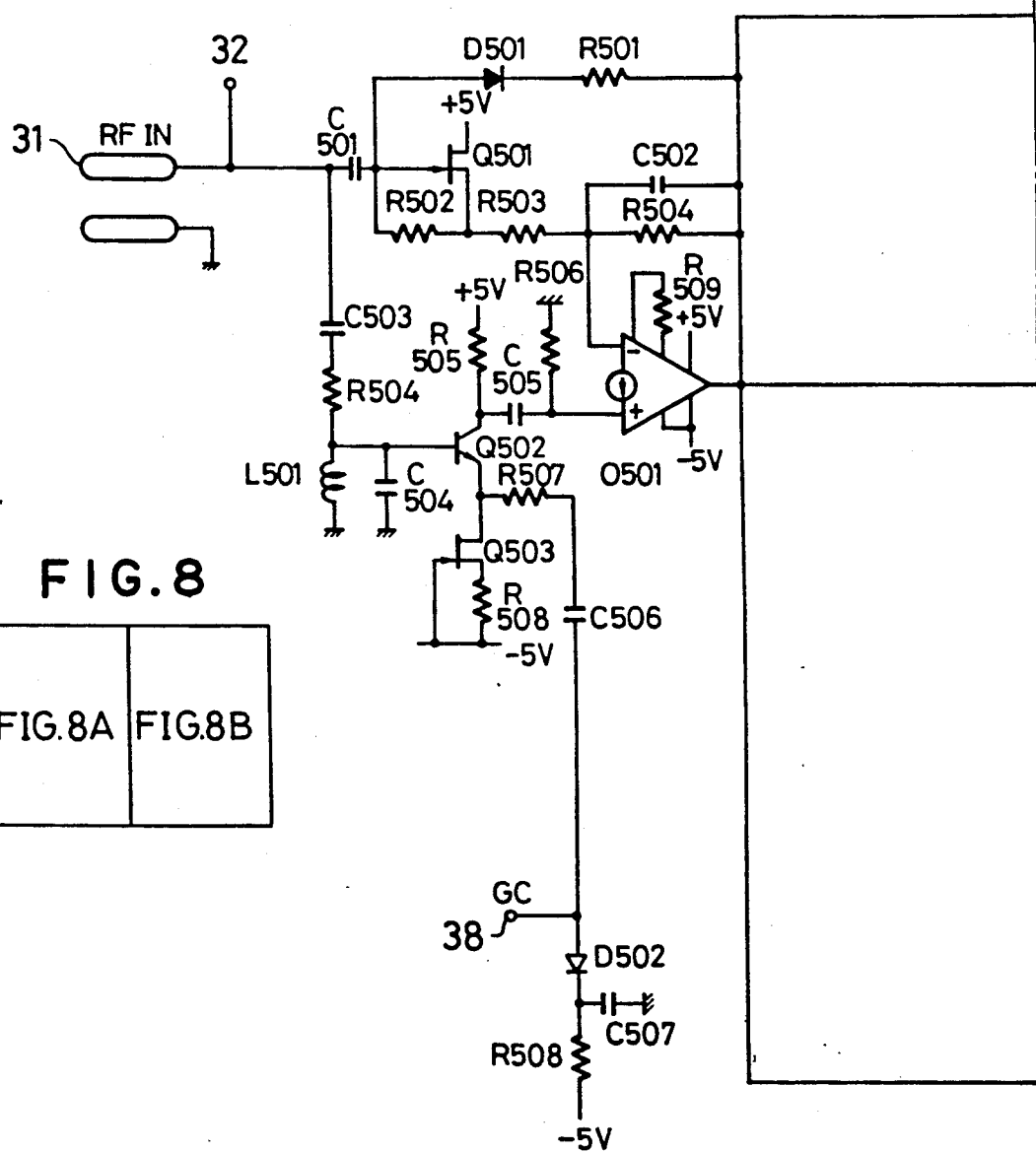
FIGS. 8A and 8B are circuit diagram of a TCR signal generator used in this invention.
Figure 8:
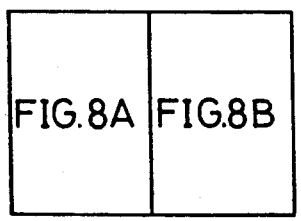
Figure 8B:
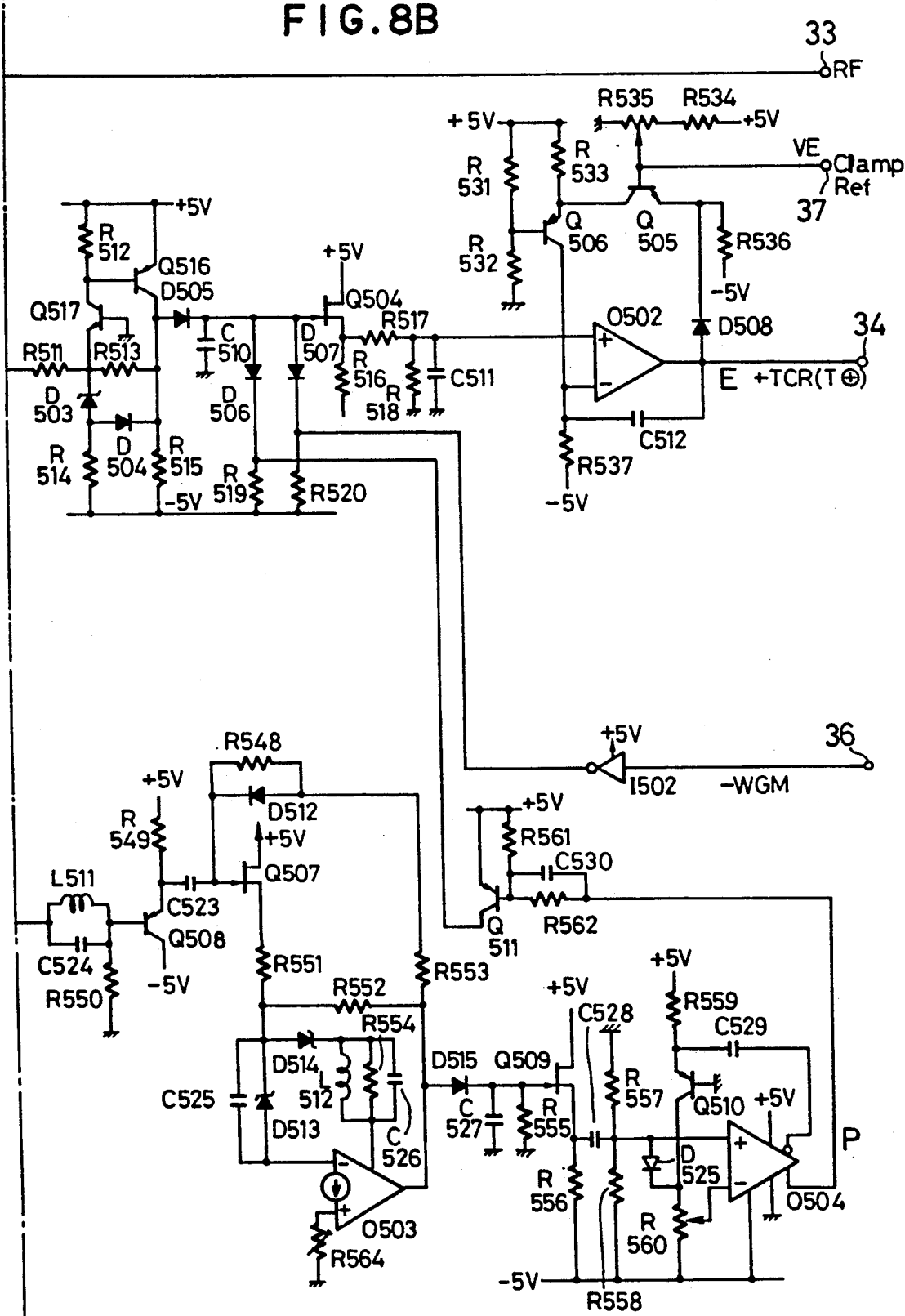

Referring to FIG. 8, a played back RF signal is applied from the terminal 14 shown in FIG. 3 to an input terminal 31 and is divided into two signal paths. The first signal path includes a capacitor C501, an FET Q501, resistors R502 and R503 and is connected to a negative input of an operational amplifier O501. The second signal path includes a capacitor C503 and a band pass filter including a resistor R504, inductance L501 and capacitor C504. This band pass filter has a center frequency equal to the frequency of the VFO signal to extract the VFO signal from the RF signal. The output of the band pass filter is coupled to the base of transistor Q502 having an emitter connected to a source of FET Q503 which has a drain connected through resistor R508 to a specific voltage and a gate connected to the specific voltage. The transistor Q502 forms a negative amplifier for inverting and amplifying the extracted VFO signal at an amplification degree determined by a current flow through the emitter of transistor Q502. The inverted and amplified VFO signal appears on the collector of transistor Q502 and is applied through capacitor C505 to a positive input of the operational amplifier O501.

Figure 9:
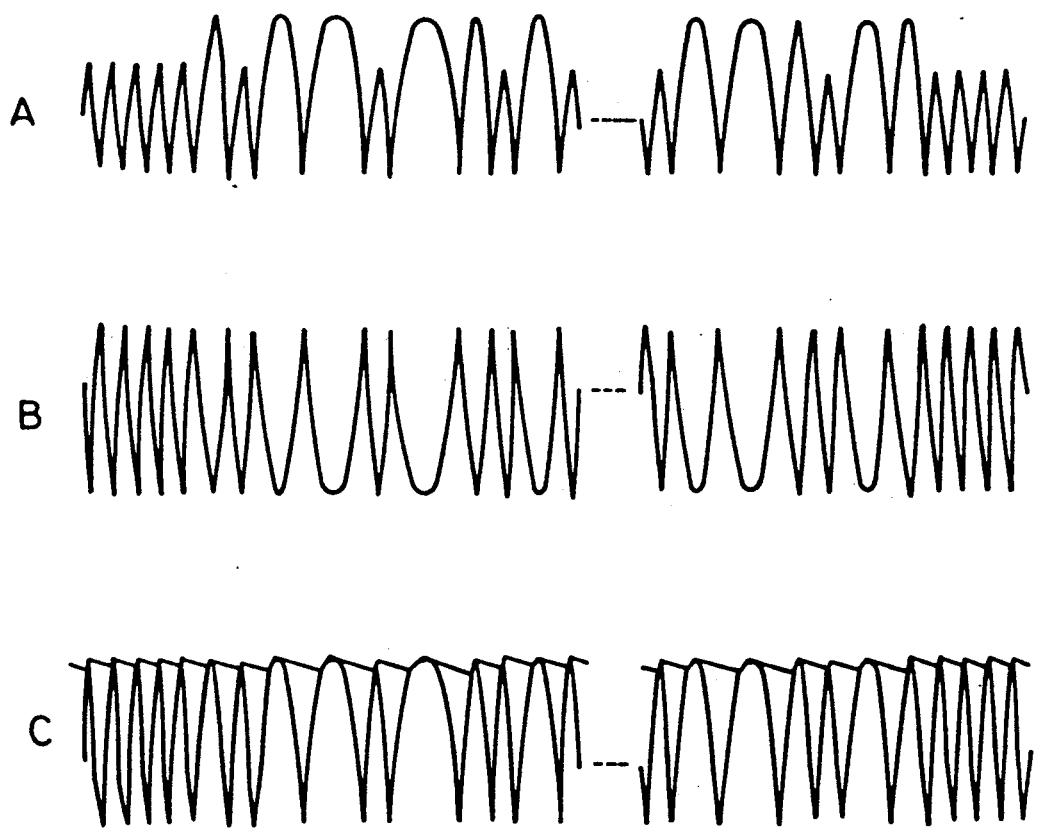
FIGS. 9A to 9C are waveforms obtained in the TCR signal generator.

The emitter of transistors Q502 is also connected through capacitor C506 to terminal 38 to which the gain control (GC) signal is applied from the circuit shown in FIG. 6. Terminal 38 is also connected to an anode of a PIN diode D502, having a cathode grounded through capacitor C507 and also to a specific voltage through a resistor R508. The PIN diode D502 has a variable resistance that is dependent on the level of the gain control (GC) signal supplied from terminal 38. Therefore, the level of the gain control (GC) signal has a direct effect on the impedance of the circuit connected to the emitter of transistor Q502, and thus on the amplification degree of the transistor Q502. The amplification degree of the transistor Q502 increases as the optical head is positioned closer to the center of the optical disk. The operational amplifier O501 forms a negative differential amplifier for producing a differential signal at the output thereof. The differential signal is indicative of the difference between the RF signal inputted from terminal 31, as shown in FIG. 9A, and the VFO signal amplified at an amplification degree determined by the gain control (GC) signal to compensate for the VFO signal level drop related to the radial position of the optical head. FIG. 9B shows the waveform of the compensated signal produced at the output of the operational amplifier O501 in an inverted form in comparison with the RF signal. The differential signal is applied from the output of operational amplifier O501 to an output terminal 33 for connection to a reading circuit, to be described later.

Capacitor C501 is connected through a series connection of a diode D501 and resistor R501 to the output of operational amplifier O501. Since the RF signal shown in FIG. 9A is applied to the negative input of the operational amplifier O501, the RF signal is inverted by it. The diode D501 is forward biased to charge the capacitor C501 with the played back RF signal fed thereto from the input terminal 31 only when a mirror mark (ODF) having the highest level is played back. When no mirror mark (ODF) is played back, the diode D501 is reverse biased. In this case, capacitor C501 is discharged through a line including resistors R502, R503 and R504 which is connected to the output of operational amplifier O501. Thus, the operational amplifier O501 produces an output signal wherein the level of each mirror mark (ODF) is clamped at a predetermined potential, as shown in FIG. 10B. This is effective to maintain the played back RF signal in a predetermined range in spite of any mirror mark level variations caused by variations in the reflection factor of the mirror surface portion of the optical disk.

The time constant, which determines the discharging time of the capacitor C501, is set at a desired value to prevent distortions of the output of the operational amplifier O501, as shown in FIG. 10C, and to maintain the reflection factor variations in the respective sectors within a permissible range. Resistor R501 is effective to keep the waveform of the output of operational amplifier O501 free from distortion during the charging duration of the capacitor C501. Although the distortion avoiding effect is greater with resistor R501 having a greater resistance, the response speed will be slower since the time constant increases. For this reason, the resistance of resistor R501 is set at an appropriate value.

Figure 11:
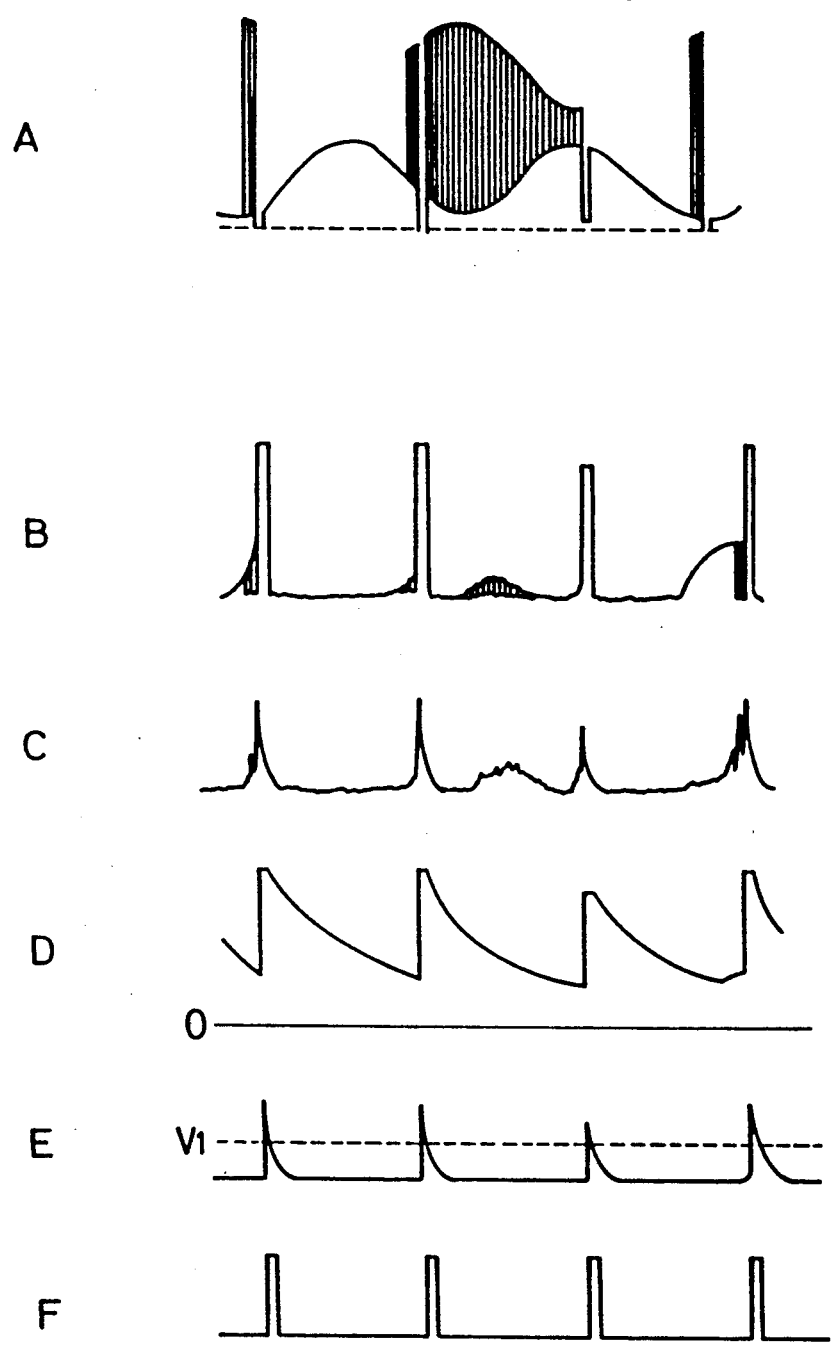
FIGS. 11A to 11F are waveforms used in explaining the operation of the TCR signal generator.

The output of operational amplifier O501 is also coupled to a band elimination filter having an inductance L511, a capacitor C524 and a resistor R550. This band elimination filter has a center frequency substantially equal to that of the VFO signal included in the RF signal for removing the VFO signal from the RF signal fed thereto from the operational amplifier O501. This is effective to avoid an incorrect mirror mark detection taking the VFO signal for the mirror mark (ODF). The output of the band elimination filter is coupled to a base of a transistor Q508 having an emitter connected through resistor R549 to a specific voltage and a collector connected to another specific voltage. The emitter of transistor Q508 is also connected through a capacitor C523 to a gate of FET Q507. FET Q507 has a source coupled to a specific voltage and a drain connected through a resistor R551 to an amplifier comprising an operational amplifier O503. The amplifier has an amplification degree that is variable by variations of a variable resistor R564 for amplifying the mirror mark (ODF) and saturating the other components, as shown in FIG. 11B. The output signal of operational amplifier O503 is supplied through diode D515 to capacitor C527. Diode D515 is forward biased to charge capacitor C527 when the voltage at the output of operational amplifier O503 exceeds the voltage across capacitor C527. Since the mirror mark (ODF) has a level that is higher than the other components of the played back RF signal, diode D515 is reverse biased so that capacitor C527 is discharged through resistor R555 when no mirror mark is played back. Therefore, the voltage across capacitor C527 has a high level when a mirror mark is played back and it decreases gradually through the resistor R555 to be a sawtooth voltage, as shown in FIG. 11D. The voltage across capacitor C527 is applied via FET Q509 to a differentiating circuit that comprises capacitor C528 and resistors R557 and R558. FIG. 11E shows a waveform of a signal produced at the output of the differentiating circuit. The output of the differentiating circuit is coupled to a positive input of an operational amplifier O504, which has a reference voltage V1 set by a variable resistor R560, connected to a negative input. Operational amplifier O504 forms a comparator along with transistor Q510, resistor R559, diode D525 and capacitor C529. This comparator compares the differentiated signal with reference value V1 to produce a pulse having a predetermined pulse width, as shown in FIG. 11F, each time a mirror mark is played back. The pulse width is determined by capacitor C529 and the resistor R559. Capacitor C527, which forms a peak hold circuit, serves to eliminate noises, as shown in FIG. 11C, which may be superimposed on the differentiated signal if there was not provided the capacitor C527.

The RF signal, shown in FIG. 9A, which is inputted from input terminal 31 is inverted and amplified by the operational amplifier O501, as shown in FIG. 9B. Furthermore the output signal of operational amplifier O501 is inverted and amplified by an amplifier that includes transistors Q516 and Q517, and applied to a peak hold circuit comprising capacitor C510, resistors R519 and R520, and diodes D505, D506 and D507. When the voltage at the output of transistor Q516 exceeds the voltage across the capacitor C510, the diode D505 is forward biased to charge the capacitor C510 with the output of transistor Q516. When the voltage across capacitor C510 exceeds the voltage at the output of transistor Q516, diode D505 is reverse biased to block the transmission of the signal to the capacitor C510. At this time, diode D506 remains turned OFF and capacitor C501 is discharged through the series circuit of diode D507 and resistor R520 for the next peak hold cycle. Thus, the peak of the signal outputted from the transistor Q516 is held by the capacitor C510 as shown in FIG. 9C and the charged voltage of the capacitor C510 is applied to a gate of an FET Q504.

FET Q504 amplifies the signal inputted to its gate and outputs the amplified signal to a low pass filter that includes resistors R517 and R518 and a capacitor C511. This low pass filter is effective to filter out the high-frequency noises which may be superimposed on the peak envelope signal during the peak hold operation and also to limit the frequency band (about 10 MHz) of the RF signal to a servo band (for example, 50 KHz). The output of the low pass filter is coupled to a positive terminal of an operational amplifier 0502. The operational amplifier 0502 forms a clamping circuit along with capacitor 512, diode D508 and transistors Q505 and Q506 for clamping the input signal to a reference voltage VE, determined by a variable resistor R535. The reference voltage (clamp level) VE is applied to an output terminal 37 and also to the base of transistor Q505.

Figure 14:
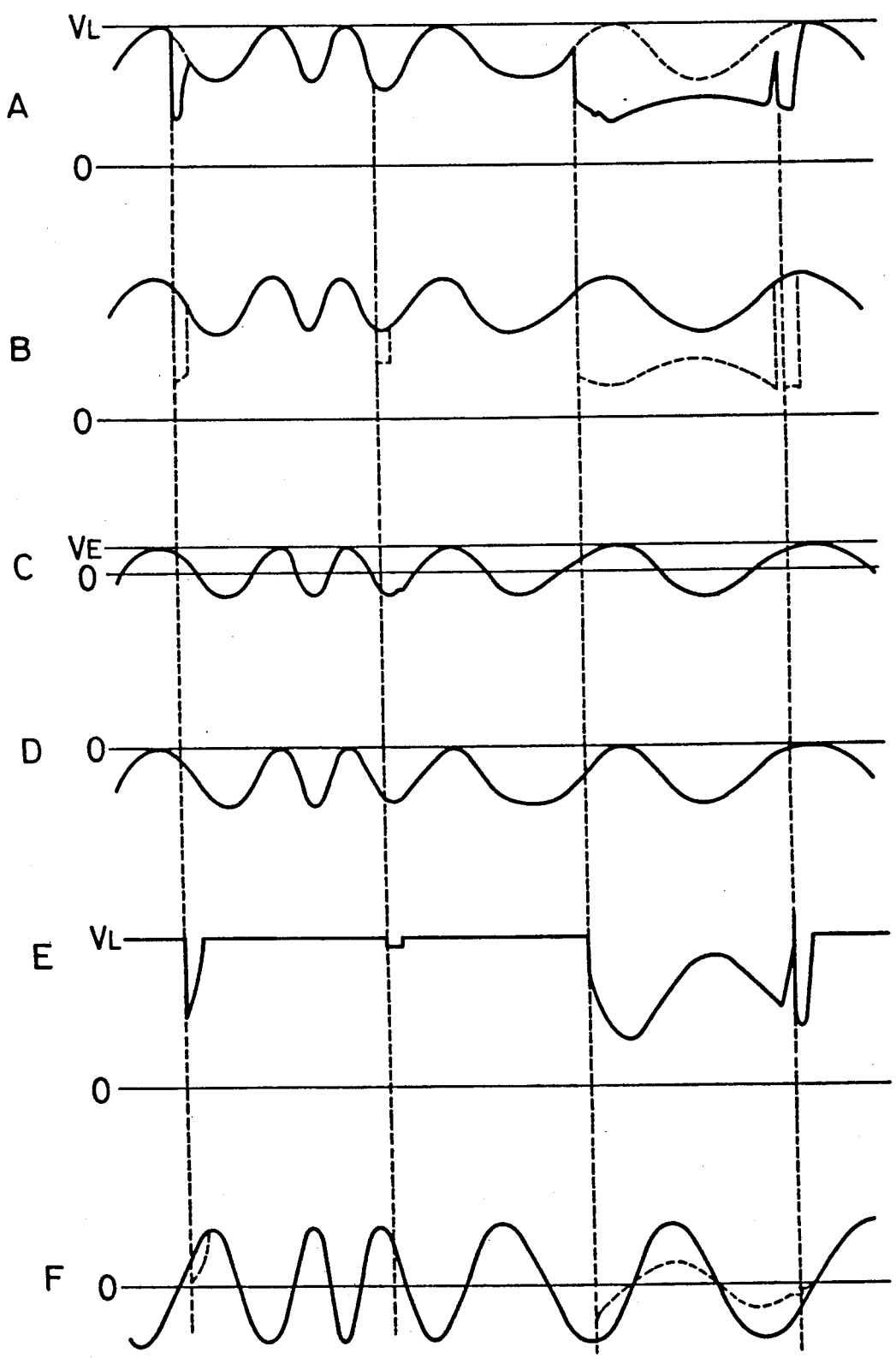
FIGS. 14A to 14F are waveforms used in explaining the operation of the servo error signal generator.

FIG. 14B shows the waveform of an input signal applied to the positive input of the operational amplifier 0502 in FIG. 8. As is apparent from the waveform, the level drops of the waveform are compensated. FIG. 14C shows the waveform of the output signal produced at the output of the operational amplifier 0502. When the input signal increases and thus the output signal increases, the voltage at the emitter of the transistor Q505 increases. As a result, the current flow from resistor R533 to transistor Q505 decreases and the current flow from resistor R533 to transistor Q506 increases. Consequently, the voltage applied to the negative input of the operational amplifier 0502 increases to decrease the voltage at the output of operational amplifier 0502. The voltage VE applied to the base of transistor Q505 is higher by a voltage Vbe than the voltage at the emitter thereof. The voltage at the output of operational amplifier 0502 is higher by the forward voltage of diode D508 than the voltage at the emitter of transistor Q505. Since the voltage Vbe is substantially equal to the forward voltage of diode D508, operational amplifier 0502 produces an output signal having peaks clamped to voltage VE which is set at the base of transistor Q505, as shown in FIG. 14C. The voltage, which appears at the output of operational amplifier 0502, is applied as a +TCR signal to output terminal 34. It is to be noted that the +TCR signal has a level that is compensated for its level drop, namely the recorded area component which is caused when the optical head passes one of the recorded areas of the optical disk, as shown in FIG. 14C. The +TCR signal is applied to the terminal 34 in FIG. 4.

The junction of diode D506 and resistor R519 is connected to a collector of a transistor Q511, an emitter of which is connected to a specific voltage and a base of which is connected to the output of operational amplifier 0504. When operational amplifier Q504 produces a HIGH level pulse shown in FIG. 11F indicating the occurrence of a mirror mark, transistor Q511 is turned OFF to turn ON the diode D506, which has been revere biased. As a result, capacitor C510 is discharged at a high rate through the series circuit of diode D506 and resistor R519 when a mirror mark is detected. This is effective to inhibit capacitor C510 from being charged with the voltage resulting from the mirror mark.

It is to be noted that the peak hold circuit may be arranged as a bottom hold circuit.

Figure 12:
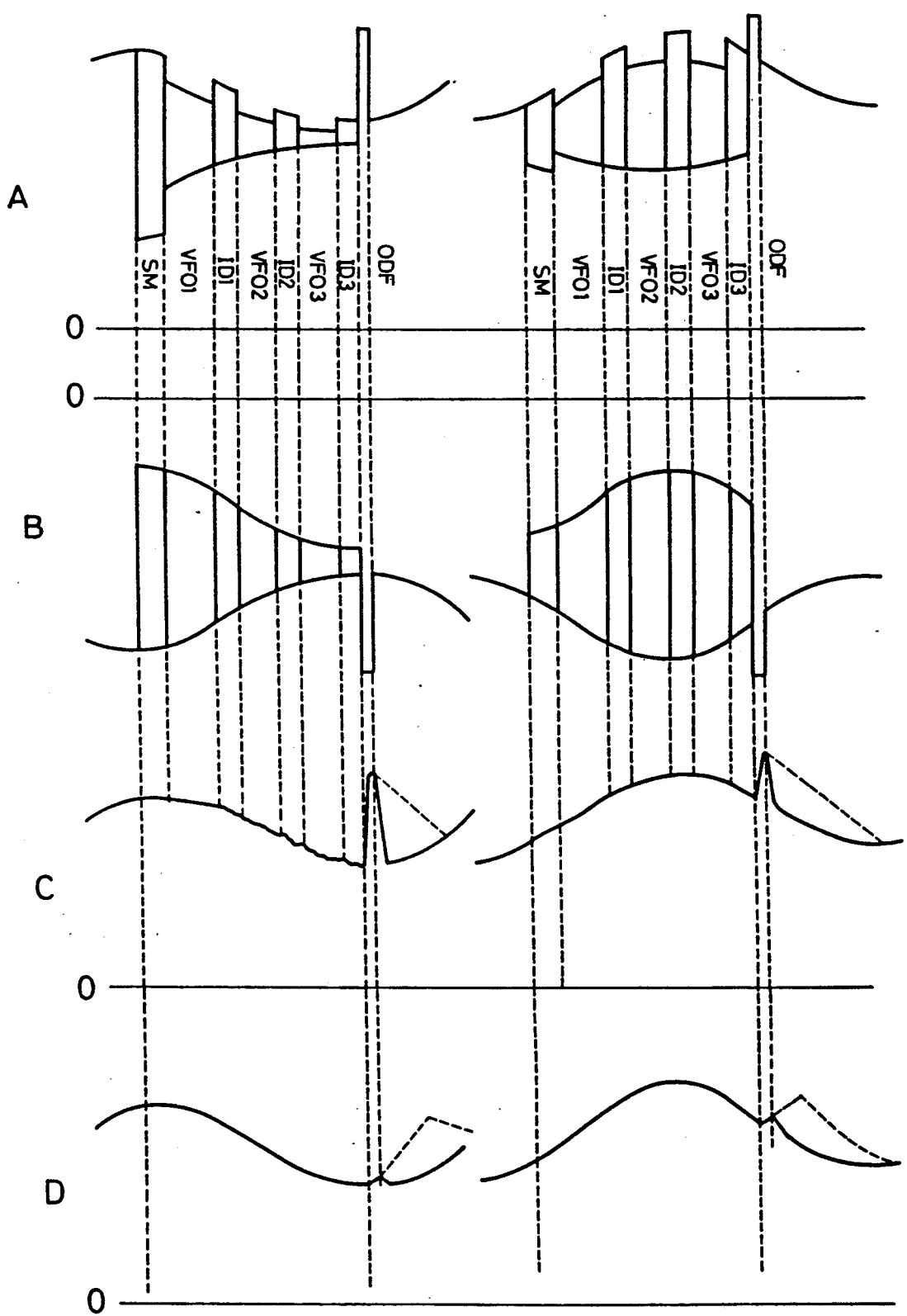
FIGS. 12A to 12D are waveforms obtained in the TCR signal generator.

FIGS. 12A to 12D show the waveforms of various signals on a reduced time scale. FIG. 12A shows the waveform of the RF signal inputted to input terminal 31 when the focusing servo control is ON and the tracking servo control is OFF. The RF signal includes track cross signals produced when the optical head traverses tracks and the VFO signals. FIG. 12B shows the waveform of the RF signal which is outputted from the operational amplifier 0501 and includes the compensated VFO signals. The waveform of the signal produced at the output of the peak hold circuit C510 is as shown in FIG. 12C and the waveform of the signal produced at the low pass filter, including capacitor C511, is an upper envelope of the output signal of the peak hold circuit C510 as shown in FIG. 12D.

If there was no means for preventing capacitor C510 from being charged with the voltage resulting from the mirror mark (ODF), the waveforms of the output signals of capacitors C510 and C511 will be as shown by the broken line in FIGS. 12C and 12D, respectively. Namely, the signal outputted from capacitor C511 includes the components of mirror marks which are not included in a signal (TA+TB) which has a relatively narrow frequency band (at most 50 KHz). As described below, in this invention, a control signal, indicative of level drops in compliance with the recorded areas, is produced from the signal (TA+TB) and a signal in which the level drops of the VFO signals are compensated. Accordingly, if the charging of capacitor C510 by the mirror mark was not prevented, the mirror mark components are included in the control signal. This is prevented in this invention because the time constant in the peak hold circuit is extremely reduced at the time of occurrence of the mirror marks.

Returning to FIG. 4, terminal 17 to which the TA signal is applied from terminal 17 shown in FIG. 3 is coupled through resistor R135 to a positive terminal of operational amplifier 0104. Terminal 18, to which the TB signal is applied from terminal 18 shown in FIG. 3, is coupled through resistor R136 to the positive input of operational amplifier 0104. Operational amplifier 0104 serves as an adder for producing a signal (TA+TB) which is indicative of the sum of the TA and TB signals. It is to be noted that the signal (TA+TB) includes track cross signals produced when the optical head traverses the tracks and level drops produced when the optical head passes one of the recorded areas having data recorded thereon. This signal (TA+TB) is applied through resistor R110 to the positive terminal of an operational amplifier 0102, having a negative input coupled to a reference voltage source that includes resistors R111 and R112. The operational amplifier 0102 serves as a comparator to compare the added signal (TA+TB) with a reference voltage to produce a Focus Zone (F+) signal indicative of a focusing zone. The output of operational amplifier 0102 is coupled to output terminal 41 for connection to the focusing servo control circuit 103.

Signal (TA+TB) is also applied from output of the operational amplifier 0104 through the resistor R108 to the second input 14 of the first integrated circuit IC101. The first integrated circuit IC101 divides the error signal FB−FA applied to the first input I1 thereof by the signal (TA+TB) to produce an output signal that is indicative of the resulting quotient (FB−FA)/(TA+TB). Output terminal I3 of the first integrated circuit IC101 is coupled to an amplifier comprising an operational amplifier 0103 for amplifying the signal fed thereto from the first integrated circuit IC101 to produce a focusing error signal F. The focusing error signal is applied to output terminal 42 for connection to the focusing servo control circuit 103. Thus, the focusing servo control circuit 103 receives a focusing error signal F+ from terminal 41 and a focusing error signal F− from terminal 42 and produces an eventual focusing error signal to an actuator which thereby locates the optical head at a predetermined distance from the optical disc recording medium.

Terminal 37, to which the Clamp Ref signal produced by resistors R535 and R534 shown in FIG. 8 is applied through resistor R181 to a negative terminal of an operational amplifier 0107, has a positive input coupled through resistor R183 to terminal 34, to which the +TCR signal produced from the operational amplifier 0502, shown in FIG. 8 is applied. Operational amplifier 0107 serves as a differential amplifier for producing a differential signal (+TCR−VE) that is indicative of a difference of the Clamp Ref signal VE from the +TCR signal. It is to be noted that the differential signal (+TCR−VE) includes the track cross signals produced when the optical head traverses the tracks but not the level drop in compliance with the recorded area. The output of the operational amplifier 0107 is coupled to a drain of an FET Q101 having a source coupled through resistors R186 and R171 to a negative terminal of an operational amplifier 0105. The gate of the FET Q101 is coupled through inverters I102 and I103 to terminal 35, to which an −ON TRK signal is applied from the computer 50. Inverters I102 and I103 have structures as shown in FIGS. 7A and 7B, respectively. Inverter I102 produces a LOW level output in response to a HIGH level input and the output thereof is OPEN in responsive to LOW level input. Inverter I103 produces a HIGH level output in response to a LOW level input and the output thereof is OPEN in responsive to a HIGH level input.

As previously desribed, the −ON TRK signal has a LOW level when the tracking servo control is ON and HIGH level when the tracking servo control is OFF. When the tracking servo control is OFF, FET Q101 is turned ON to couple the output of operational amplifier 0107 to the negative input of the operational amplifier 0105, while a positive input is coupled to the output of the operational amplifier 0104. Operational amplifier 0105 serves as a differential amplifier for producing a differential signal that is indicative of a difference signal {(TA+TB)−(+TCR−VE)} of the signal (+TCR−VE) from the signal (TA+TB). Since the signal (TA+TB) includes the track cross signals produced when the optical head traverses the tracks and the level drops produced when the playback is performed in the recorded areas having data recorded thereon, whereas the signal (+TCR−VE) includes only the track cross signals, the differential signal {(TA+TB)−(+TCR−VE)} produced at the output of operational amplifier 0105 includes only the level drop components. The output of operational amplifier 0105 is coupled through resistor R142 to the second input I4 of the second integrated circuit IC102. The second integrated circuit IC102 divides the error signal (TB−TA) applied to the first input I1 thereof from operational amplifier 0108 by the differential signal {(TA+TB)−(+TCR−VE)} applied to the second input I4 thereof from the operational amplifier 0105 to produce an output signal that is indicative of a resulting quotient {(TB−TA)/((TA+TB)−(TCR−VE))}. The signal is outputted from the output terminal I3 of the second integrated circuit IC102 to a negative input of operational amplifier 0106 that forms a negative amplifier along with resistors R149, R151 and R155, and the output signal of the negative amplifier is supplied as a tracking error signal T− to output terminal 43, for connection to the tracking servo control circuit 104. Terminal 34 is also connected directly to output terminal 44 for connection to the tracking servo control circuit 104. Thus, the tracking servo control circuit 104 receives a tracking error signal T− from terminal 43 and a tracking signal T+ from terminal 44 and produces an eventual tracking error signal to an actuator which thereby controls the position of the optical head (a beam spot on the optical disk) with respect to a desired one of the tracks.

Figure 13:
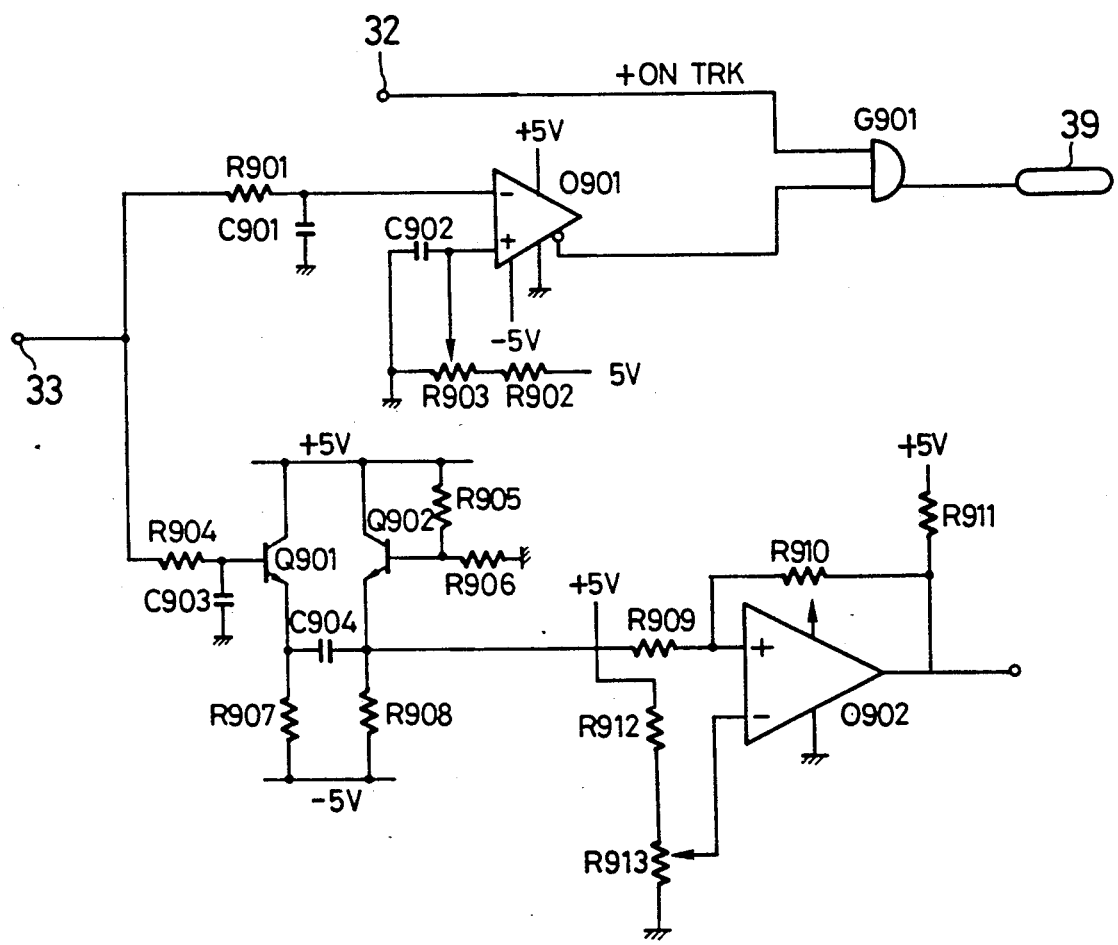
FIG. 13 is a circuit diagram of a reading circuit.

Referring to FIG. 13, a reading circuit shown in the drawing comprises a clamping circuit having transistors Q901 and Q902. The clamping circuit has an input from terminal 33, to which the RF signal is applied, as described in connection with FIG. 8. The clamping circuit clamps the RF signal that is inputted from a filter comprising resistor R904 and capacitor C903. The output of the clamping circuit is coupled to the positive terminal of operational amplifier 0902, having a negative input connected to a reference node of a voltage divider formed by a pair of resistors R912 and R913 connected between a positive voltage and ground. Operational amplifier 0902 serves as a comparator for comparing the clamped signal with a reference voltage determined by resistors R912 and R913 to produce a pulse signal having a shaped waveform. The pulse signal is used in reading various data recorded in the control track of the optical disk. The data recorded on the control track can be read even when the tracking servo control is OFF.

The reading circuit also includes another comparator, operational amplifier 0901, having a negative input coupled to terminal 33. This comparator compares the RF signal inputted through a filter comprising resistor R901 and capacitor C901 with a reference value determined by resistors R902 and R903 to shape the waveform of the RF signal. The output of the comparator is connected to one input of an AND gate G901, a second input of the AND gate G901 being coupled to terminal 32, to which a +ON TRK signal is applied from computer 50. The +ON TRK signal has a HIGH level when the tracking servo control is ON and a LOW level when the tracking servo control is OFF. AND gate G901 is OPEN to pass the output of the comparator as RAW DATA to output terminal 39 in response to a HIGH input, indicating the fact that the tracking servo control is ON. The RAW DATA is used in reading the sector marks, for example.

The operation of the gain control apparatus of this invention will be described further with reference to FIGS. 14A to 14F. When the optical head is moving at a high rate in the radial direction of the optical disk with the focusing servo control being ON and with the tracking servo control being OFF, the played back RF signal has a level that is increased (track cross component) each time the optical head traverses a track and a level that is decreased (recorded area component) each time the optical head passes one of the recorded areas including pre-format areas having pre-format data recorded thereon. FIG. 14A shows the waveform of the signal (TA+TB) produced at the output of the operational amplifier 0104. The signal (TA+TB) includes no playback data but the recorded area component in compliance with the recorded areas, because the amplifier including the operational amplifier 0104 has a narrow frequency band as described previously. Signal (TA+TB) also includes the track cross component, as shown in FIG. 14A.

The differential amplifier including the operational amplifier 0107 subtracts the Clamp Ref signal (DC component VE) from the +TCR signal to produce an output signal (TCR−VE), as shown in FIG. 14D. This output signal contains only the track cross components. On the other hand, the signal (TA+TB) outputted from operational amplifier 0104 contains the track cross components and recorded area components, as shown in FIG. 14A. The differential amplifier, including operational amplifier 0105, subtracts the signal (TCR−VE) from the signal (TA+TB) to produce a control signal {(TA+TB)−(+TCR−VE)} which includes only the DC components (recorded area components) produced when the optical head passes the recorded areas, as shown in FIG. 14E. Although the reference voltage VE is used to set the DC bias for the +TCR signal at a predetermined value, it is to be noted that the reference voltage VE may be set at zero. In this case, operational amplifier 0107 is removed and terminal 34 is directly coupled to the drain of FET Q101.

The control signal {(TA−TB)−(+TCR−VE)} is applied to the second input terminal I4 of the second integrated circuit IC102 which receives the error signal (TB−TA) at the first input I1 thereof. The waveform of the error signal (TB−TA) is indicated by the broken curve in FIG. 14F. The second integrated circuit IC102 divides the error signal (TB−TA) by the control signal {(TA+TB)−(+TCR−VE)} produce an output signal indicative of the resulting quotient at its output I3. This output signal increases as the control signal fed from the output of operational amplifier 0105 decrease and vice versa. The output signal is applied to the amplifier including the operational amplifier 0106 and amplified by it to produce a tracking error signal T−. The tracking error signal T−, indicated by the solid curve in FIG. 14F, is applied to output terminal 43 for connection to the tracking servo control circuit 104.

This operation is performed not only when the optical head is moving at a high rate from one track to another during a seek or jump mode, but also when the optical head traverses one or more tracks before the tracking servo control is ON.

When the tracking servo control is resumed for a normal recording/playback operation, the −ON TRK signal applied to terminal 35 in FIG. 4 is changed to its LOW level. As a result, the FET Q101 is turned OFF to block the transmission of the differential signal (+TCR−VE) to the negative input of the differential amplifier 0105. Consequently, operational amplifier 0105 produces a control signal corresponding to the signal (TA+TB) applied thereto from operational amplifier 0104. Since the tracking servo control is ON, the signal (TA+TB) includes no track cross component but the recorded area component. Therefore, the control signal (TA+TB) is applied from the operational amplifier 0105 to the second input I4 of the second integrated circuit IC102 in the same way as in the case described above.

Although in the embodiment described above, the control signal produced from the output of the differential amplifier including operational amplifier 0105 is used only to compensate the tracking error signal, it is to be noted, of course, that the control signal may also be used to compensate the focusing error signal. In this case, the output of the differential amplifier including operational amplifier 0105 is connected through resistor R108 to the second input I4 of the first integrated circuit IC101, instead of the connection of the output of the operational amplifier 0104.

What is claimed is:

1. An automatic gain control apparatus, comprising:
   means for receiving at least one light beam which is incident on an optical disk and is reflected by said optical disk for producing a signal in accordance with a state of said optical disk;
   means for holding a playback signal, which is produced from said light beam receiving means and which includes data recorded on said optical disk, when data is recorded on said optical disk;
   means responsive to a control signal for controlling a gain of a tracking error signal; and
   means for generating said control signal from said signal outputted from said holding means.

2. An automatic gain control apparatus as claimed in claim 1,
   wherein said light beam comprises first and second light beams, wherein said light beam receiving means comprises:
   a first photo sensor having at least two elements on each of which said first light beam is incident and from output signals of which a tracking error signal is produced; and
   a second photo sensor on which said second light beam is incident and from an output of which a focusing error signal is produced,
   said playback signal being produced from a sum of signals outputted from said first and second photo sensors.

3. An automatic gain control apparatus as claims in claim 1,
   wherein said playback signal holding means comprises:
   a capacitor for holding said playback signal outputted from sand amplifying means; and
   means for permitting a transmission of said playback signal to said capacitor when said optical disk is played back, and inhibiting the transmission of said playback signal to said capacitor when said optical disk is recorded.

4. An automatic gain control apparatus as claims in claim 1,
   wherein said apparatus further comprises a low-pass filter which passes a low frequency component of a signal outputted from said playback signal holding means to said control signal generating means.

5. An automatic gain control apparatus as claims in claim 2,
   wherein said apparatus further comprises:
   means for amplifying a signal outputted from said first photo sensor; and
   means for reducing said signal outputted from said first photo sensor to said amplifying mean when said optical disk is recorded.

6. An automatic gain control apparatus as claimed in claim 5,
   wherein said apparatus further comprises:
   second means for amplifying a signal outputted from said second photo sensor; and
   second means for reducing said signal outputted from said photo sensor to said second amplifying means when said optical disk is recorded.

7. An automatic gain control apparatus as claimed in claim 2, wherein said second photo sensor comprises four elements.

8. An automatic gain control apparatus as claimed in claim 2,
wherein said apparatus further comprises:
means for extracting a first signal from said playback signal outputted from said playback signal holding means;
means for amplifying said first signal extracted by said extracting means; and
means for adding said first signal amplified by said amplifying means and said playback signal outputted from said playback signal holding means.

9. An automatic gain control apparatus as claimed in claim 8,
wherein said first signal amplified by said amplifying means comprises a signal having the most greatest high frequency among signals included in said playback signal.

10. An automatic gain control apparatus as claimed in claim 8,
wherein said apparatus further comprises a reading circuit for reading data from said playback signal outputted from said adding means.

11. An automatic gain control apparatus as claimed in claim 10,
wherein said reading circuit comprises:
a clamping circuit for clamping said playback signal outputted from said adding means; and
a comparator for comparing said playback signal outputted from said clamping circuit with a reference level.

12. An automatic gain control apparatus as claimed in claim 10,
wherein said reading circuit comprises:
a comparator for comparing said playback signal outputted from said adding means with reference level; and
a gate for passing a signal outputted from said comparator only when a tracking servo is on.

13. An automatic gain control apparatus, comprising:
means for detecting a position of a portion of a disk apparatus in relation to a disk and for producing a position signal in accordance with said position of said portion of said disk apparatus in relation to said disk;
means for holding a playback signal, which includes said position signal and a signal representing data recorded on said disk, while data is recorded on said disk;
means for generating a control signal from said signal outputted from said holding means;
means responsive to said control signal for controlling a gain of a tracking error signal; and
means for changing said position of said portion of said disk apparatus in relation to said disk, in accordance with said tracking error signal.

14. An automatic gain control apparatus as claimed in claim 13,
wherein said detecting means comprises first and second electromagnetic transmission beams, and said detecting means comprises:
a first sensor having at least two elements on each of which said first transmission beam is incident, said first sensor forming output signals from which a tracking error signal is produced; and
a second sensor on which said second transmission beam is incident, said second sensor forming an output signal from which a focusing error signal is produced,
said playback signal being produced from a sum of signals outputted from said first and second sensors.

15. An automatic gain control apparatus according to claim 1, wherein said playback signal holding means holds said playback signal for at least a predetermined period of time.

16. An automatic gain control apparatus according to claim 15, wherein said predetermined period of time corresponds to a time taken to record data onto one sector of said disk.

17. An automatic gain control apparatus according to claim 16, wherein said predetermined period of time equals said time taken to record data onto one sector of said disk.

18. An automatic gain control apparatus according to claim 17, wherein said disk comprises an optical disk.

19. An automatic gain control apparatus according to claim 13, wherein said playback signal holding means holds said playback signal for at least a predetermined period of time.

20. An automatic gain control apparatus according to claim 19, wherein said predetermined period of time corresponds to the time taken to record data onto one sector of said disk.

21. An automatic gain control apparatus according to claim 20, wherein said predetermined period of time equals said time taken to record data onto one sector of said disk.

22. An automatic gain control apparatus according to claim 21, wherein said disk comprises an optical disk.

23. An automatic gain control apparatus in an optical disk apparatus having a reproducing mode and a recording mode and means for switching between said recording mode and said reproducing mode, said automatic gain control apparatus comprising:
means for receiving at least one light beam which is incident on an optical disk and reflected by said optical disk and for producing a signal in accordance with a state of said optical disk;
means for holding said signal produced by said light receiving means while said optical disk apparatus is in said reproducing mode before switching to said recording mode, and for continuing to hold said signal after said optical disk apparatus has been switched to said recording mode;
means responsive to a control signal for controlling a gain of a tracking error signal; and
means for generating said control signal from said signal held by said holding means.

24. An automatic gain control apparatus according to claim 23, wherein said means for receiving comprises:
a first photosensor having at least two elements, a first lightbeam being incident on each of said at least two elements; and said at least two elements each producing output signals for producing a tracking error signal; and
a second photosensor, a second light beam being incident on said second photosensor, said second photosensor producing a focusing error signal, said playback signal being produced from a sum of signals outputted from said first and second photosensors.

25. An automatic gain control apparatus according to claim 23, wherein said means for holding comprises:

a capacitor for holding said signal produced by said means for receiving; and means for permitting a transmission of said signal produced by said means for receiving to said capacitor when said optical disk apparatus is in said reproducing mode, and inhibiting the transmission of said signal produced by said means for receiving to said capacitor when said optical disk apparatus is in said recording mode.

26. An automatic gain control apparatus according to claim 23, wherein said automatic gain control apparatus further comprises a low-pass filter which passes low frequency components from said signal held by said means for holding to said means for generating said control signal.

27. An automatic gain control apparatus according to claim 24, further comprising means for amplifying said output signal produced from said first photosensor and means for reducing the level of said output signal produced from said first photosensor before being input to said amplifying means when said optical disk apparatus is in said recording mode.

28. An automatic gain control apparatus according to claim 27, wherein said apparatus further comprises second means for amplifying said signal produced from said second photosensor, and second means for reducing said signal produced from said second photosensor before being input to said second amplifying means when said optical disk apparatus is in said recording mode.

29. An automatic gain control apparatus according to claim 24, wherein said apparatus further comprises:

means for extracting a first signal from said signal outputted from said means for holding;

means for amplifying said first signal extracted by said means for extracting; and means for adding said first signal amplified by said means for amplifying and said signal which is held by said means for holding.

30. An automatic gain control apparatus according to claim 29, wherein said first signal amplified by said means for amplifying comprises a signal having the highest frequency components included in said signal held by said means for holding.

31. An automatic gain control apparatus according to claim 1, further comprising means for amplifying said playback signal which is held by said means for holding.

32. An automatic gain control apparatus according to claim 13, further comprising means for amplifying said playback signal which is held by said means for holding.

* * * * *

UNITED STATES PATENT AND TRADEMARK OFFICE
CERTIFICATE OF CORRECTION

PATENT NO. : 5,189,654
DATED : February 23, 1993
INVENTOR(S) : T. MINAKUCHI

It is certified that error appears in the above-indentified patent and that said Letters Patent is hereby corrected as shown below:

At column 16, line 65, (claim 6, line 7), of the printed patent, before "photo" insert ---second---.

Signed and Sealed this

Fifteenth Day of October, 1996

Attest:

BRUCE LEHMAN

Attesting Officer     Commissioner of Patents and Trademarks